United States Patent [19]

Smith

[11] Patent Number: 4,972,628
[45] Date of Patent: Nov. 27, 1990

[54] HORTICULTURAL LAYOUT GROUND COVER ASSEMBLY

[76] Inventor: Robert E. Smith, R.D. #1, Smith Rd., Verona, N.Y. 13478

[21] Appl. No.: 325,215

[22] Filed: Mar. 17, 1989

[51] Int. Cl.$^5$ .............................................. A01G 23/02
[52] U.S. Cl. .......................................... 47/86; 47/33; 47/9
[58] Field of Search ........................ 47/9, 33, 41.1, 85, 47/86, 87, 25, 32

[56] References Cited

U.S. PATENT DOCUMENTS

| | | | |
|---|---|---|---|
| 2,662,343 | 12/1953 | Rice | 47/9 |
| 3,139,208 | 6/1964 | Irwin et al. | 47/87 |
| 4,357,884 | 11/1982 | Rast, Jr. | 47/9 |

Primary Examiner—David A. Scherbel
Assistant Examiner—Michele Van Patten
Attorney, Agent, or Firm—Schmeiser, Morelle & Watts

[57] ABSTRACT

A modular, foraminous ground cover for constructing custom floricultural grounds displays. Pre-shaped, fiberglass ground cover subassembly modules are provided with a plurality of discretely placed foramens which will accommodate therein the placement of seedlings or plants. The subassembly modules are joinable to one another by tongue-in-groove margins that are straight edges interior of a display assembly; the outer border of the display is reinforced and is defined as its periphery. Where required for strength and pest protection, a flexible planar strip is attachable to the display periphery reinforcement and serves as an in-ground footing and rodent barrier.

14 Claims, 4 Drawing Sheets

HORTICULTURAL LAYOUT GROUND COVER ASSEMBLY

BACKGROUND OF THE INVENTION AND PRIOR ART

1. Field of the Invention

The present invention pertains generally to ground coverings for use in horticultural and floricultural grounds layouts and, more particularly to modular, pre-shaped ground covers that may be selectively disassembled and reassembled and, when in use, provide effective mulching for in-ground seedlings and plants while suppressing adverse weed growth.

The invention pertains further to devices which constitute in-ground barriers to burrowing rodents and other plant eating pests such as snails, slugs and the like.

2. Prior Art Discussion

The instant inventor is a protoartist in what is termed nuclear floriculture—a floricultural art which employs techniques such as the movably interlocking, modular ground cover assemblies of the instant invention. The nuclear flower gardens and other plant displays resulting from the application of the techniques and the use of the apparatus hereinafter disclosed may also be termed "interlocking gardens".

A detailed study of the prior art indicates a long and continuing search by horticulturists and floriculturists for the ideal ground cover which would provide a number of worthwhile characteristics such as: rodent and pest protection; mulching, i.e., the technique of retaining in-soil moisture and nutrients; fertilization; weed suppression; and ultimately, carefree usage while being versatile, easy to use and economically attractive. In addition to the foregoing characteristics, and perhaps most importantly, the resulting floricultural display must be very attractive, quite independent of the flora chosen, and each rendition should lend itself to a uniqueness of design.

Although observable in part, the aggregate of the aforementioned characteristics is not to be found in any of the prior art discovered by the applicant, indeed, not even in its totality. For example, one of the most relevant pieces of prior art, embodying some of the elements of the instant invention, is disclosed in the patent issued to Scharf, U.S. Pat. No. 4,268,992, for a Tree Protector. The invention of Scharf includes a hollow vertical shaft connected to an annular ground cover which is divided into two sections. The two sections are joined immovably at overlapping interior margins by screw means. Further to the Tree Protector invention is a plurality of holes in which are inserted hollow, foraminous hold-down spikes through which dissolved nutrients may be passed during the occasional watering required while using this invention. Because only one plant is meant to grown through the arrangement (up the vertical shaft), no concern is paid to design of other than circular shape of the ground cover, nor the likelihood of the movability of its two halves in relation to one another. The primary purpose of the Tree Protector is to provide a well within the annular ground cover that will collect water and divert it to the in-ground, hold-down spikes. There is no need to invite an interlocking mobility of the ground cover sections simply because, once constrained by the addition of the vertical shaft, they must be permanently and immovably secured to one another. Further, since the invention entertains usage with rooted stock (such as trees or large shrubs) there is no overriding need to "lock out" all light in order to rigorously suppress weed growth. Simply because, with rooted stock, topical herbicides may be applied to any seedling brazen enough to extend a shoot into the joined margins of the ground cover sections or through the hold-down spike holes. The invention of Scharf is excellent for fulfilling that inventor's goals and objects of invention; but, it falls terribly short of providing the aggregate characteristics so long sought by floriculturists such as the instant inventor.

An extremely clever device for suppressing ground plant growth surrounding a monument is disclosed in U.S. Pat. No. 4,317,309 issued to Sheldon and inclusive of novel means for retaining the suppression ground cover in position. This plant growth suppression device comprises a plurality of plastic shield pieces that are interconnected with each other and anchored by spikes placed into the ground around the monument base which is to remain weed-free by use of the plant growth suppression device. The lower surface of each shield piece may be formed with a pair of longitudinal retaining tracks and coupled with another shield piece by plate members that are retained within the longitudinal tracks across the interfaces between shield piece pairs. Since the spikes are pressed into the ground, they effectively anchor the plate members to the ground. Although inventor Sheldon did not suggest it, it is quite conceivable that his device, with its interlocking-through-track assembly margins, might be useful for plant growth suppression in other geometries. Its most notable disadvantages relative to the instant inventor's list of desired ground cover characteristics are: lack of rodent or pest protection; lack of means to selectively accommodate plant growth through the device; immobility between the various section of the overall assembly; inability to nurture and water the soil immediately below the device; and, general lack of the versatility needed to provide a variety of grounds displays. This latter disadvantage accrues more because the Sheldon interlock and hold-down means makes it practically impossible to easily remove a section of the total assembly without disturbing another section. As it may be seen later in this disclosure, the instant inventor avoids the problem involved with the use of complicated or contrived interlock mechanisms, as well as the immobility of such mechanisms, by interlocking his invention with conventional tongue-in-groove means, while sectionalizing an overall assembly into selectively attachable and removable ground cover panels. Any ground cover panel is connected to the overall assembly by rather conventional means—screws. Such fundamental and traditional connection means grant the instant invention a high degree of versatility and imbue the user with ultimate flexibility. The reader will come to appreciate these facts as the remaining prior art is discussed.

A most interesting use of preformed decorative patterns is revealed in U.S. Pat. No. 4,622,746 as a Guide For Decorative Grass Cutting, issued to Appelson in 1986. This patent is disclosive of means comprising a planar template cut to the contour of a desired pattern, laid upon the ground and interlocked to a series of support members that are used to support the template in the desired attitude and position. The interlock happens to be slightly movable, constrained mostly by the contour of the template, and constructed of a margin-in-hem apparatus that is somewhat analogous to tongue-ingroove mechanisms. Thus, there is embodied therein similar movable, tongue-in-groove joining mechanisms.

Other relevant art such as U.S. Pat. No. 3,041,781, 4,219,941, 4,308,688 and 4,648,203, issued to Richter, Hair, Revane and Worzek respectively, disclose other interesting means that serve as rodent barriers, moisture barriers or, in general, tree protectors. These patents combine previously known prior art features, yet exemplify, as late as 1987 in the case Worzek, the continuing struggles of the floriculturist to provide meaningful ground cover and weed suppression (with rodent barrier means) for the purposes of constructing grounds displays of great aesthetic value.

No matter how the very worth-While prior art features are combined, by even the most experienced floriculturist, nothing could be achieved in the way of gardening aids or adjuncts that would provide the full panoply of characteristics sought by the floriculturist and detailed earlier in this section. Rather then being impelled by the prior art to make the instant invention, the instant inventor was compelled by the growing demand for a flexible and inexpensive ground cover adjunct to make the instant invention and inculcate its features to the rest of the profession.

SUMMARY OF THE INVENTION

The means whereby the instant inventor has provided a unique solution to the problems facing the modern horticulturist or floriculturist, relative to the creation of grounds displays, consists in a ground cover assembly comprised of one or more modules having a predetermined peripheral geometry. The module further consists in a planar ground cover bearing a plurality of holes or foramens that are receptive of a wide variety of plants or seedlings. The planar ground cover comprises an opaque, water impervious unit and the hole diameters are varied according to the desires of the invention's user. The periphery of a module may be described as curvilinear, again to fit the needs and desires of the user, and is reinforced in order to provide the planar ground cover a certain degree of rigidity and marginal strength. Reinforcement may be had in a dual fashion; the first comprising an integral peripheral bead and the second comprising a multiplicity of peripheral brace or batt pairs. A rodent and pest barrier is also provided as an adjunct to the ground cover by affixing to the periphery thereof a planar, flexible sheet of water impervious material, such as plastic or fiberglass, alongside and onto the peripheral reinforcement, so as to project orthogonal to the planar cover, into the subsoil. The width of the rodent guard strip is, of course, determinable by the type of soil and the pest infestation which is to be avoided.

In a logical extrapolation of the single unit to the modular embodiment of the invention, the inventor provides a ground cover assembly consisting in two or more modules. The peripheral geometry of the aforesaid assembly may be of any desired shape and it is divided, fractioned, or modularized by the division of the planar ground cover into two or more modules, also termed subassemblies. The division is by straight cuts, hereinafter termed margins, from one point on the periphery to another. Since the entire geometry of the ground cover assembly is generally curvilinear, the divisions giving rise to the separate modules can be termed segments which result in two margins, one on each subassembly portion of the division. In order to reassemble the separate modules, a tongue-in-groove apparatus is provided. One of the margins is made so as to extend slightly, and is termed the tongue, while the other margin is afforded flat lateral strips above and below the division and effecting thereby a groove into which the aforesaid tongue may movably, that is slidably, reside. All parts of the general assembly, including the planar cover sections, the strips used to create the marginal grooves of the various modules, and the rodent barrier means and peripheral reinforcement means, may be all fixed and secured by means of traditional, non-corrosive screw assembly.

Further non-salient paraphernalia or elements will be revealed in the following Detailed Description of the Preferred Embodiment, and the reader will gain a greater appreciation of the instant invention thereby. The reader will also come to appreciate the simplicity of the invention as well as the flexibility embodied in the concept thereof. Accordingly, it may be seen that the principal objects of the invention, that is, the incorporation of the multiple desirable characteristics first disclosed in the Prior Art Discussion, are clearly acquired by the inventor's embodiment.

BRIEF DESCRIPTION OF THE DRAWINGS

Of the Drawings:

FIG. 3b is a sectional end elevation taken at 3b—3b in FIG. 3a; and

DETAILED DESCRIPTION OF THE PREFERRED EMBODIMENT

At the risk of appearing pedantic, the instant inventor, having years of experience in the preparation of floricultural grounds displays, deems it necessary to reiterate the shortcomings found in the plethora of ground cover art that currently exists. Most ground cover, whether for the purposes of preparing grounds displays or for applications in general horticultural settings, such as vegetable gardens or massive plantings of row crops, consists of opaque, foramenous sections, usually strips, of water-impervious material such as polyethylene. As ground cover affording conservation of soil moisture and supression of weeds, such apparatus are highly utilitarian. Nonetheless, their usage in grounds displays, especially such displays that entertain irregular change-out of the flora involved, are extremely limited. For example, contrast the use of black polyethylene strips that are used in the home vegetable gardens to support the growth of, say, tomato plants. The gardener begins by preparing the soil and dispersing into it fertilizer and nutrients, including a good deal of mulch such as peat moss. Then a ground cover of black polyethylene is laid down and secured by one or more of several known methods. Holes are either precut in the polyethylene (or, now made) prepatory to the insertion therein of plant seedlings. Thereafter, all the gardener must do is periodically water the tomato plants and rely upon the dark ground cover to retain moisture, supress weed growth and retain subsoil heat to further the growth of the plants. In contrast, the floriculturist, in preparing a grounds display, faces two problems which cannot be readily solved by the use of the vegetable gardener's ground cover. Where the gardener may allow his plants to grow full term, the floriculturist is faced with a never ending requirement to change out portions of grounds displays, and is further required to re-treat the subsoil, depending upon different flora implantings that are entertained during the term of the overall display. Thus, the floriculturist must have an apparatus that will allow him or her to disassemble part of the ground cover, remove and replant, while conditioning the subsoil with a different chemical and/or moisture protocol. Additionally, the floriculturist, because of the wide variety of flora and the likelihood of the grounds displays being an integral part of grounds treatment in general, must be prepared to face a wide variety of plant pests such as moles, snails, cut worms and the like, as well as be required to treat other portions of grounds display such as by cutting grass and trimming, right up to the interface of lawn and floricultural display. The instant invention provides an answer to the floriculturist's problems, as detailed above, by providing a modular ground cover comprising one or more subassembly modules having therein discretely placed foramens to accommodate the placement of seedlings or plants. Further, one or more subassembly modules are joinable to another, or a plurality of others, by use of tongue-in-groove margins that are straight edges and interior of the periphery of the complete display assembly. Tongue-in-groove margins are employed because such will allow the joining of one subassembly or module to another and yet allow for the movement of one module with respect to the other, without breaking the ground cover to allow penetration of sunlight that would surely cause the germination and the nourishment of unwanted flora within the display proper. Where additional strength is required in order to work about the display, say for example in running a lawn mower onto the periphery of the ground cover assembly, a strengthening bead (integral with the periphery), or peripheral braces are employed to give the ground cover assembly the requisite strength. Accordingly, if pest protection such as a barrier to moles is required, a flexible planar strip is attached completely about the display periphery to the very means which are used to strengthen that periphery, thus serving as both an in-ground footing and rodent barrier.

Figure 1:
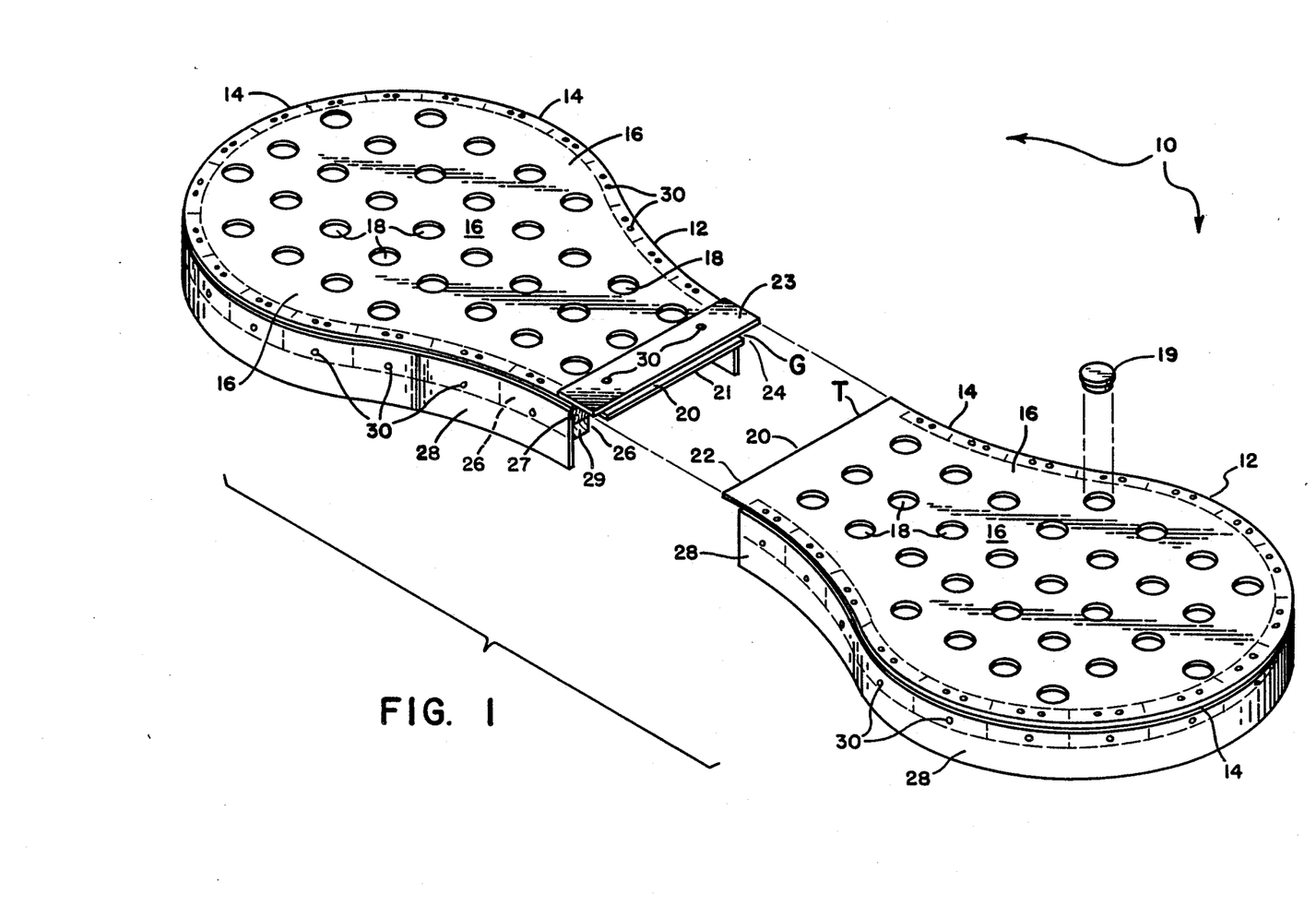
FIG. 1 a partially exploded isometric illustration of a preferred embodiment of the invention.

Having described the invention apparatus in view of the benefits of such, a clearer detail shall now be provided with reference being had to the drawings herein. With particular reference to FIG. 1, there is disclosed a partially exploded isometric illustration of the invention in a preferred embodiment that incorporates all elements necessary to achieve the fullest utility contemplated by the instant inventor. The entire ground cover assembly 10 consists of one or more modules 12 that have the defined geometry that is required to effect the final floricultural display. The border of the preferred geometry is known as the periphery 14 and is exemplified herein as a stylized figure "8" pattern. The pattern is, in this instance, divisible or separable along a margin 20 which consists of any straight cut, within the periphery 14 of the ground cover assembly 10. Divisions of any ground cover assembly are made for the sake of expediency and are determinable upon consideration of several factors such as: size of the assembly 10; ease of handling desired by the user; design or geometry of the grounds display; weight of the materials being used to effect the opaque ground covering; and strength required of the overall assembly.

The more readily noticable aspects of the assembly 10 consist of a shaped, planar cover 16 which is composed of an opaque, water impervious and chemical resistant material such as fiberglass. Those of ordinary skill will recognize that many materials are readily available on today's market that would suffice, having the requisite durability, strength, opacity and chemical resistivity that are needed for in-ground placement or ground contact. The planar cover 16 may be molded or cast or, in some instances, cut from existing sheet goods to the desired geometry that would be necessary to effect a desired grounds display. The planar sheet may be cut in a single piece or, preferably, in several modules providing that each module has at least a straight margin 20 for joining to another straight margin of the module to which the first is to be joined. The inventor's insistence on straight margins 20 is quite practical in that, upon joining the modules or subassemblies 12 together to effect the full ground cover assembly 10, the user must insure that the integrity of the opaque ground cover 16 not be disturbed at any time during the life of the grounds display. By integrity it is meant herein that at no time will a crack or fissure appear in the planar covering 16, save the intentional openings to be hereinafter discussed, that would allow the penetration of sunlight to the subsoil. To this end, the margins 20 shall be joined with a unique slidably engaging, movably interlocking apparatus.

Continuing now with the description of the remaining elements in FIG. 1, there is seen at multiple locations, which are determined by the floriculturist, a plurality of foramens or holes 18 effecting an overall ornamental design. Should any of the holes later not be needed, specially designed plugs 19 (or bungs) are inserted into any hole which is to remain unused. The plug 19 is of the bung type that may be firmly pressed into the hole 18. An alternate embodiment would be the muffin-type plug which has a cap over the top of the bung portion so as to insure the exclusion of light, yet provide a means for ready removal by merely grasping the muffin-like top. Relative to the aforesaid slidably engaging, movably interlocking apparatus along the margins hereof, there is shown an extension 22 of the right hand subassembly 12, denoted T and termed by the inventor a tongue. The tongue 22 may be merely an extension of planar cover 16 along margin 20 or it may be a separate adjunct which has been attached to the cover. Receptive of the tongue 22 is a groove denoted herein as item 24. The groove 24 is created by affixing to the margin 20 of the left hand subassembly 12 a planar strip 21 below the module's planar cover 16 and another planar strip 23 above and affixed to the planar cover 16 parallel to strip 21. The planar strips 21, 23, held in a stand-apart registry by the intervening margin 20, of the left hand subassembly 16, effectively presents a groove 24 receptive of tongue T (22). Finally, about periphery 14, beneath cover 16 and exclusive of marginal areas 20, a reinforcement is provided to the ground cover 16 which is either integral with the ground cover or separate therefrom and fabricated on an ad hoc basis. In the former case, a reinforcement bead (not shown in this illustration) is formed at the same time the module cover is constructed. The bead is given a thickness sufficient to reinforce the periphery 14 while concurrently accepting a rodent guard 28, generally attached by means of screws 30, so that the guard which is a flexible, planar strip of material similar to the planar cover 12 projects downward, essentially orthogonally, into the subsoil, thus providing rodent barrier means, as well as the strength-giving, in-ground footing. The second, ad hoc construction that provides the same peripheral strengthening and rodent barrier 28 affixing means, comprises pairs 26 of wooden braces that are screwed to the ground cover subassembly cover 12 about the complete periphery 14 thereof. The paired or stacking arrangement allows the upper member 27 of the pair 26 to be affixed by screws 30 to the planar cover 16, and thereafter by screws 30 to the lower member 29. The rodent barrier 28 is then affixed to either (or both) of the braces 27, 29 in the brace pair 26. The reason for this construction is that it provides an expedient solution to the problems of replacing portions of the planar cover 16, replacing portions of the rodent barrier 28 and changing or replacing portions of the groove 24 apparatus at planar strips 21 and 23. For example, should a portion of ground cover subassembly module 12 planar cover 16 be damaged, it may be unscrewed by removing screw fasteners 30 and lifted off peripheral reinforcement 26 or rodent barrier 28, depending on whether it be of the integral bead type (not shown) or the paired brace type 26. Should the user desire to block any of the foramens 18, it is only necessary to insert plugs 19 to effect the integral opacity found in the remaining portions of module 12 planar covers 16. A distinct advantage to the paired brace 26 type of reinforcement and rodent barrier attachment is the allowance of some slidable movability between brace 26 members 27, 29. This assures that the connection between planar covers 16 and in-ground footing (rodent guard 28) apparatus is not completely rigid, therefore minimizing the likelihood of peripheral cracks and violation of the pest-rodent guard barrier. The reader, having been apprised of the salient elements of the instant invention, is now aware of the broad utility afforded by it for the purposes of acquiring unique grounds displays. The modular approach, which may be readily iterated by the user, even to the extent of closing or opening existing foramens to accommodate more or less of the selected seedlings or plants, cannot go unappreciated. Practically any grounds display design may be entertained by the floriculturist or gardener since any geometry may be segmented into a plurality of modules with the resulting segment margins adapted with the tongue-in-groove (T-G) apparatus of the instant invention.

Figure 2A:
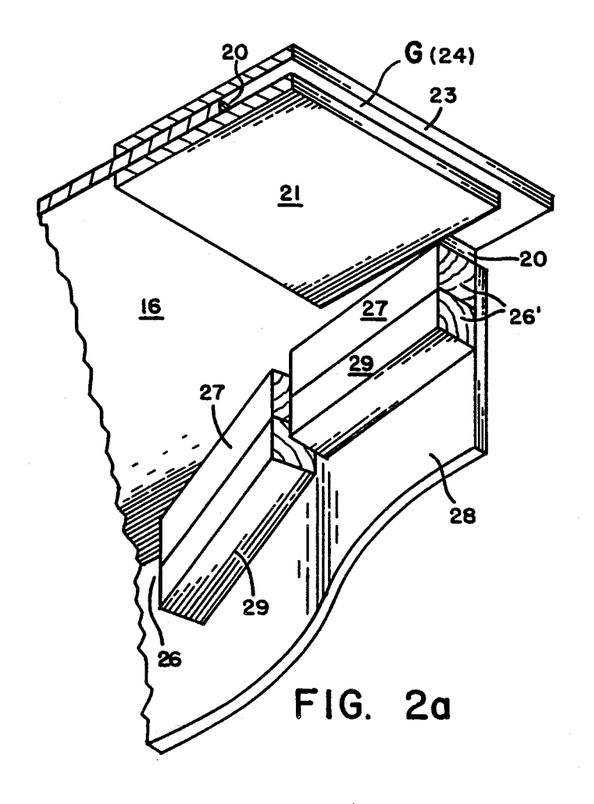
FIG. 2a is a section of FIG. 1 taken proximate the area G and a from beneath the object.
Figure 2B:
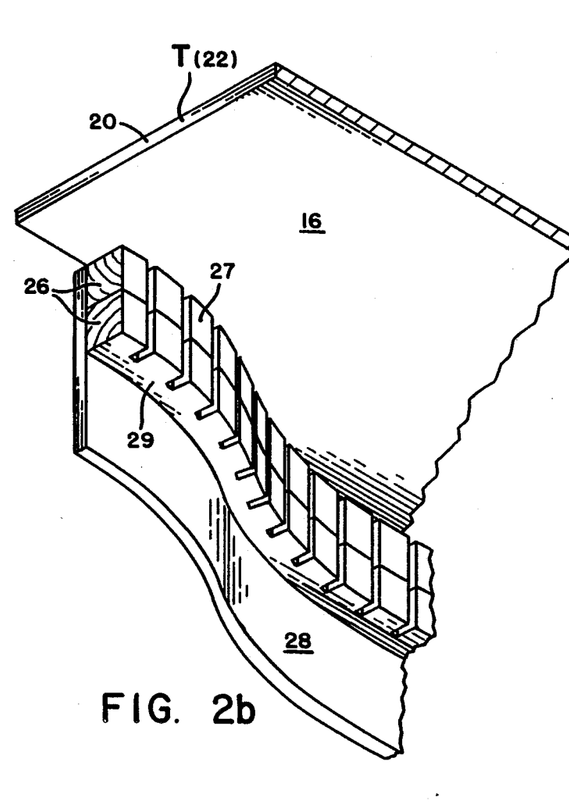
FIG. 2b is a section of the FIG. 1 embodiment directly opposite the section disclosed in FIG. 2a and seen from beneath the object.

The groove 24 details that are referred to as G, as well as the tongue 22 details referred to a T in FIG. 1 are displayed in greater detail in FIGS. 2a and 2b. It may be readily seen in FIG. 2a that the margin 20 does not extend beyond the braces 26 as far as that of FIG. 2b. When the planar cover 16 is first divided along margin 20, the bracing in this embodiment is yet to be affixed to the planar cover 16. After the division is made, groove 24 is created by the addition of strips 23 (at the top of) and 21 (beneath) margin 20 as depicted in FIG. 2a. Thereafter, braces 26, at least the upper member 27, are affixed to the planar cover 16 by screw 30 means (not shown). Lower brace members 29 may be affixed to upper members 27 just prior to attaching rodent guard 28, should such be desired. Referring now to FIG. 2b, it is better understood why tongue 22 appears to exist as an extension of planar cover 16 at margin 20. In reality, bracing 26 is placed so that it will abut bracing 26' directly below groove 24, as seen in FIG. 2a. Thereafter, if desired, rodent guard 28 may be affixed to the bracing strips as previously detailed in FIG. 2a. It is noteworthy to point out the difference between the bracing systems in FIG. 2a and FIG. 2b. The kerfed strips of FIG. 2b are merely a different wood worker's application of the principles articulated above; such wood working detail in the realization of the braces is left to the choice of the individual user.

Figure 3A:
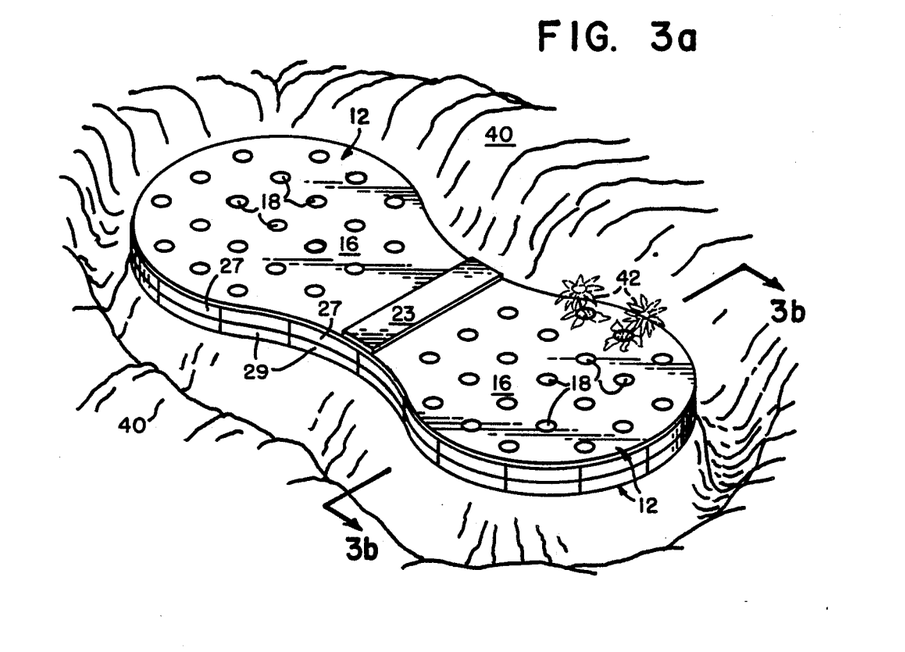
FIG. 3a is the preferred embodiment of FIG. 1 completely assembled and installed prior to backfilling.
Figure 3B:
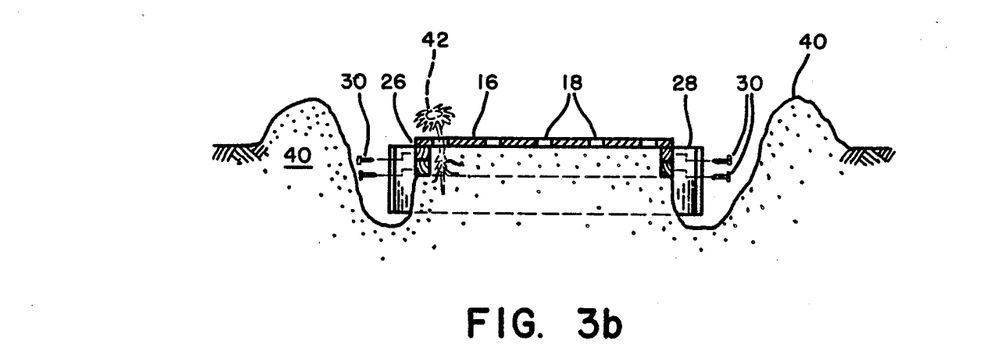

As with many inventions that are useful for blending the skill of a worker with the art of a craftsman, there exists a particular procedure for installation of the instant invention that will produce the most favorable and aesthetic results. Particular reference to FIG. 3a discloses a ground cover assembly 10 comprised of two modules 12 as it would appear installed over an area of pretreated soil. For the sake of illustration, the instant inventor shall now explain how a grounds display of flowers, say of the composite type such as marigolds or mums, may be constructed. The soil is first worked and the requisite nutrients and moisture conserving materials, such as peat or vermiculite, are added and worked into the soil. It is leveled and the modules 12 are assembled over the treated and leveled soil area. Great care is exercised in the mating of the two modules, assuring that the top strip 23 of the grooved margin covers the tongue portion (not shown) of the second module, completely. In FIG. 3a, the modules are shown installed with upper batten 27 and lower batten 29 members of peripheral reinforcement braces already installed. For the sake of clarity the size of the braces has been exagerated. The foramens 18 which will used as receptors of seedlings and plants 42 are shown open to the underlying and treated subsoil. A trench has been formed around the display with the overburden 40 pulled back slightly so as to allow access and fixing of the rodent barrier. FIG. 3b is an end sectional view taken at 3b—3b of FIG. 3a. In this sectional view the overburden 40 appears less exaggerated and in the proportions that it will usually exist. The reader may note that planar cover 16 is pressed down to the ground and peripheral braces 26 already form a fairly sturdy footing. At this point in the installation, rodent barrier 28 is installed around the peripheral brace 26 structure by use of screws 30. After the installation of the rodent barrier, overburden 40 is pushed back into the trench and the surrounding soil is leveled so that it is just slightly above or flush with planar cover 16. Immediately thereafter, seedlings or plants 42 may be implanted through foramens 18. It is interesting to note that the instant inventor's fixing means, ordinary corrosion resistant screws 30, is of high utilitarian value. Practically every element that has been used to effect the total ground cover assembly (with rodent barrier) is selectively replacable: planar covers 16; groove -acquiring strips 23, 21; reinforcement braces 27, 29 and rodent guard 28.

Figure 4:
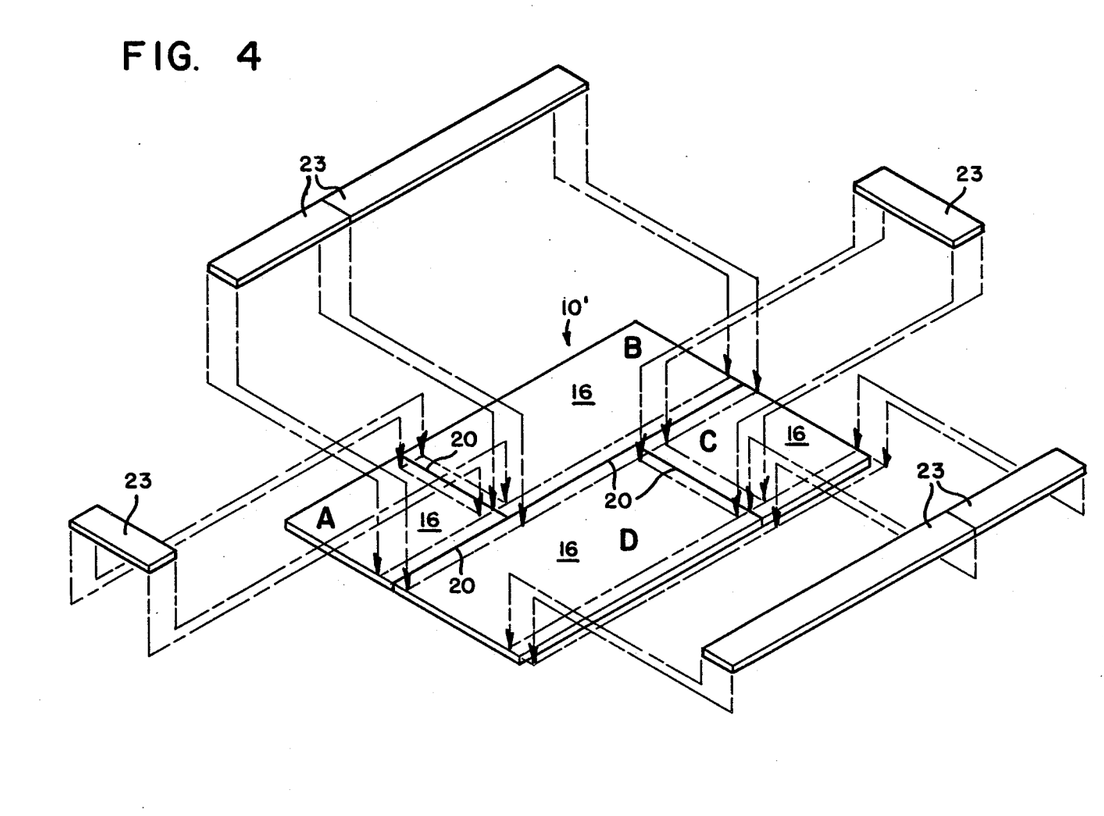
FIG. 4a is an exploded illustration of only top planar margin element installation used in attaining groove mechanization.

Although every aspect of the instant invention has been disclosed and thoroughly discussed, the instant inventor is desirous of pointing out how the fabricated groove assembly may be used to great advantage. To this end, reference is made to FIG. 4, a rectangular ground cover assembly 10', sans foramens. The subassemblies are denoted A through D clockwise from the nine o'clock position. For the sake of clarity, articulation of the placement of lower groove strips 21 will not be made and only the placement of upper groove strips 23 shall be suggested. Those of ordinary skill, having practiced the invention will become adept at selecting groove strip placements to suit their own particular needs. The groove strip 23 between the juncture of subassembly A and B is attached on the B side. The strip between A and D subassemblies is affixed to the A subassembly while the strip between B and D and B and C is affixed to the B subassembly margin. The strip covering the margin between C and D is attached to the D subassembly and finally, the margin extensive of subassemblies C and D bears the separate groove strips by attachment to the subassemblies C and D, respectively. Lower groove strips 21 are generally placed on the margin 20 directly below the respective upper strip 23; however, it is not necessary that the lower strip be as extensive as the upper strip provided the particular matching of subassemblies is done so as to prevent the slightest sunlight penetration in the event the subassemblies move with respect to each other. Normally, the inventor has observed movements of subassemblies up to one-half inch, and movements up to one inch should be anticipated. Irrespective of the amount of movement anticipated, the groove and tongue strips may be readily engineered to such required lengths and widths. The only limiting factor on the width of tongue and groove strips appears to be the center-to-center location of the various foramens.

From the experience of the instant inventor, it is known that the inveterate floriculturist or gardener may make valuable and extensive use of the instant invention at a notable savings in the expense of nurturing floral beds or gardens. Considerable savings may be realized in the usual expenditures for fertilization, weed supression and irrigation. Those of ordinary skill may readily discern alternate means for embodying the principles taught herein and practice with the invention should imbue them with an extensive amount of skill in its application. Different physical arrangements and readily available means of reinforcement or attachment will most likely be suggested by other practitioners; such alternatives are considered to fall readily within the scope of the present invention and are considered to be secured by the claims hereinafter appended.

What is claimed is:

1. A horticultural ground cover assembly comprising fractionable, slidably engaging, movably interlocking, planar cover means of selectively removable/replacable, essentially water impervious, opaque ground cover means; and fixable, flexible rodent barrier footing means, said footing means projecting orthogonally, essentially continuously from braces disposed on the periphery of said planar cover means and beyond a plant setting tap root depth into subsoil on which said assembly is set to a depth at least equivalent or more than the length of a plant setting tap root.

2. The invention of claim 1 wherein said assembly comprising movably interlocking, planar cover means comprises a planar ground cover mode of water impenetrable, opaque material having therein at predetermined points a plurality of holes, said holes having predetermined diameters and receptive of plugs.

3. The invention of claim 1 wherein said fractionable, slidably engaging, movably interlocking, planar cover means is fractioned and comprises one or more movably interlocking means comprising at least one tongue means and one groove means, said groove means separable from said planar cover means and adaptable to various and diverse overlap requirements.

4. The invention of claim 3 wherein said tongue means comprises a first straight interior portion of said planar means of said ground cover assembly, said first straight interior portion comprising a protruding margin located on a fractional subassembly of said ground cover assembly.

5. The invention of claim 3 wherein said groove means comprises second straight interior portions of said planar cover means of said ground cover assembly, said second straight interior portions comprising two spaced apart variable width receptor margin extensions located on another fractional subassembly of said ground cover assembly and receptive therebetween a tongue means.

6. A horticultural ground cover assembly comprising a fractionably modular, slidably engaging, movably interlocking foraminous planar cover means of selectably uncoverable, essentially water impervious, opaque ground cover, said ground cover assembly further comprising fixable, flexible, rodent barrier means removably attached to said planar cover means at non-interlocking portions thereof by mutual attachment to a peripheral mechanism, and further attached so that said barrier orientation is essentially orthogonal to and essentially continuous about the periphery of said planar cover means depending into soil which on said cover rests.

7. The invention of claim 6, wherein said rodent barrier means is removably attachable to said planar means by a peripheral mechanism, said mechanism comprising flange means disposed along the periphery of said planar means so it is in contact with the ground when said ground cover assembly is installed, and said flange means provides thereby an essentially vertical surface to serve as attachment means for said rodent barrier.

8. The invention of claim 7 wherein said flange means further comprises a plurality of elongate battens and said battens are assembled in pairs so that each pair, arranged about the margins of said planar means and disposed on the ground, affords a point of attachment of said planar means and, contemporaneously, at least one point of attachment for said rodent barrier means and further, each batten of said pair affords contact points for said rodent barrier means or, said planar means.

9. The invention of claim 6 wherein said fractionally modular, slidably engaging, movably interlocking, foraminous, planar cover means is fractioned and comprises one or more movably interlocking means comprising at least one tongue means and one groove means.

10. The invention of claim 9 wherein said tongue means comprises a first straight interior portion of said ground cover assembly, said first straight interior portion comprising a protruding margin located on a fractional subassembly of said ground cover assembly.

11. The invention of claim 10 wherein said groove means comprises second straight interior portions of said ground cover assembly, said second straight interior portions comprising two spaced apart variable width receptor margin extensions located on another fractional subassembly of said ground cover assembly and receptive therebetween of a tongue means.

12. A horticultural ground cover comprising: A dividable planar cover means adapted for bearing a plurality of foramens and made of a water impervious opaque material and further, when divided, defining along the lines of division at least two straight margins accommodating tongue-in-groove construction for slidable and translational engagement with an interlocking connection; rodent barrier means for attachment along all peripheral border portions of said planar cover; and a plurality of braces disposed along said non-interlocking border portions and in contact with the ground, said braces fixable to said planar means and to said rodent barrier means.

13. The invention of claim 12 wherein said peripheral border portions of said planar cover means comprise a reinforcement bead adapted to fixably receive thereon said rodent barrier means.

14. An improved ground cover assembly having rodent resistive means and conducive to soil moisture retention comprising:

an essentially vertically disposed rodent barrier-footing comprising one or more flexible strips of a rigid, water impervious material defining a width of soil penetrating depth sufficient to keep out burrowing rodents;

a conterminous brace disposed about and along a top margin of said barrier; and a modular, planar cover that is connected to said brace, is fractionable and has thereon along a dividing margin thereof tongue and variable depth-acquiring groove means, whereby said dover is fixed to said brace and thence to said footing and said assembly is situated onto prepared soil with said footing inserted to sufficient depth to rest said cover on said soil and thereafter said cover may be fractionally removed and/or replaced.

* * * * *